June 20, 1939.  J. W. COOMBS  2,163,484
FILE STORAGE STRUCTURE
Original Filed Oct. 22, 1935   3 Sheets-Sheet 3
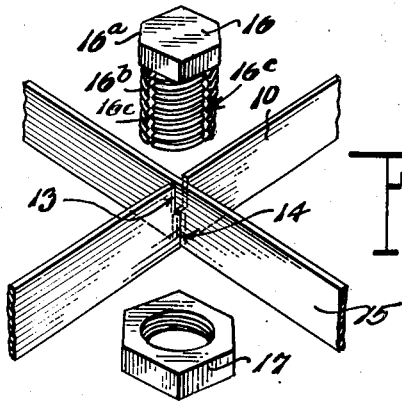
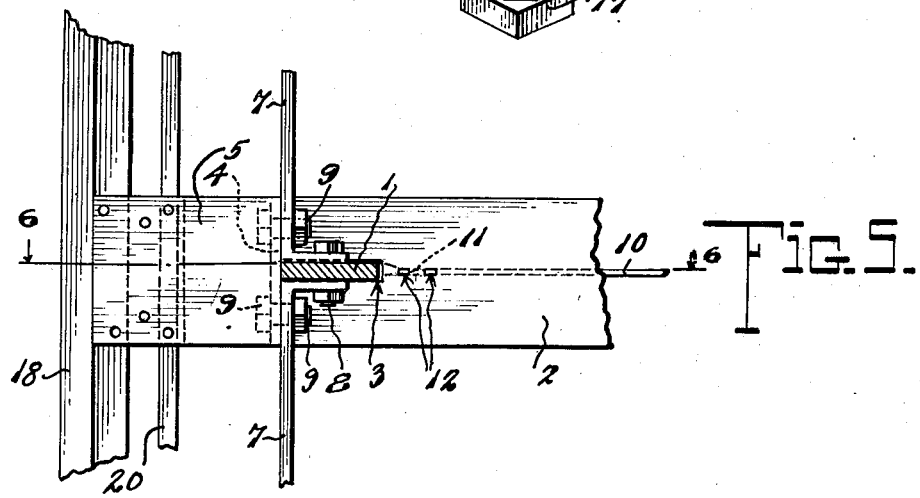
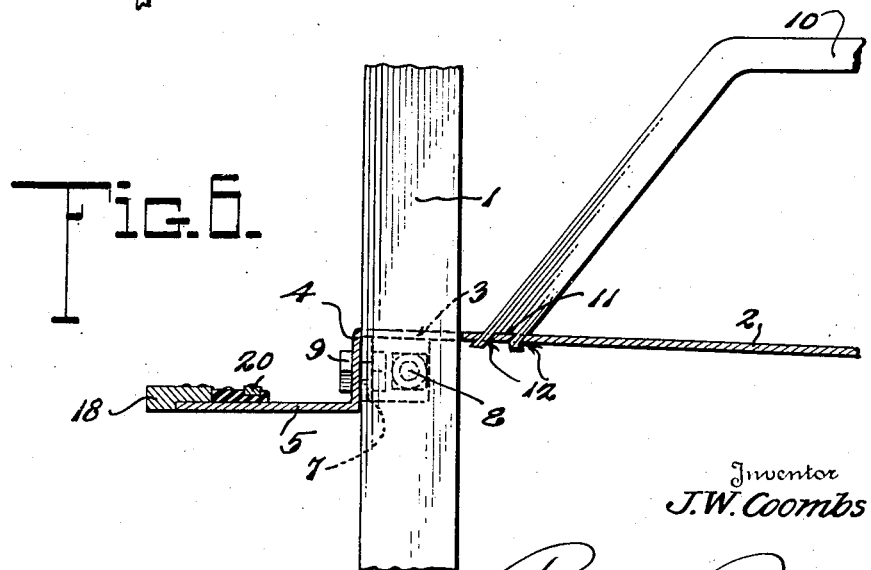
Inventor
J. W. Coombs
By Robt × Robb
Attorneys Patented June 20, 1939

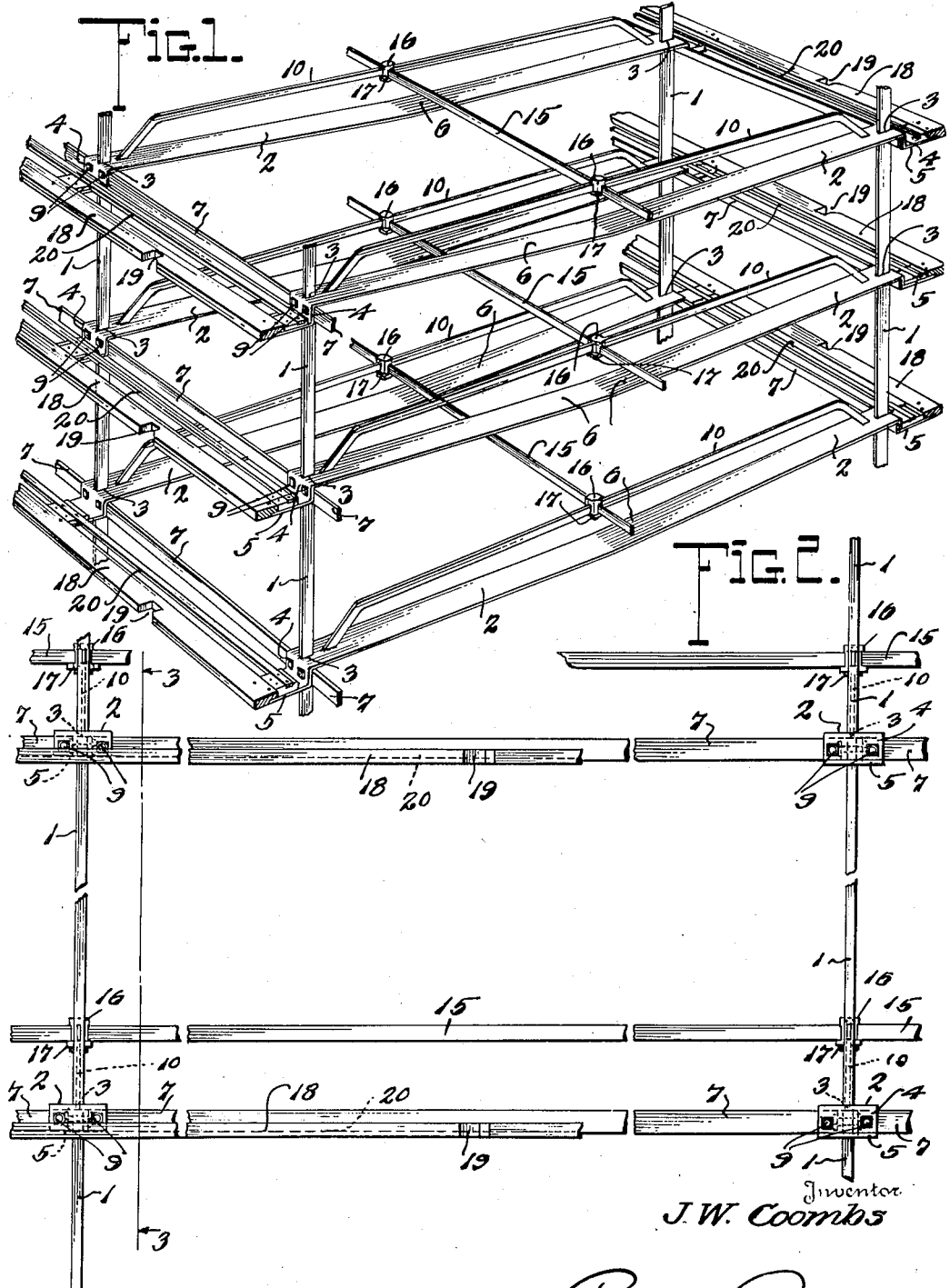

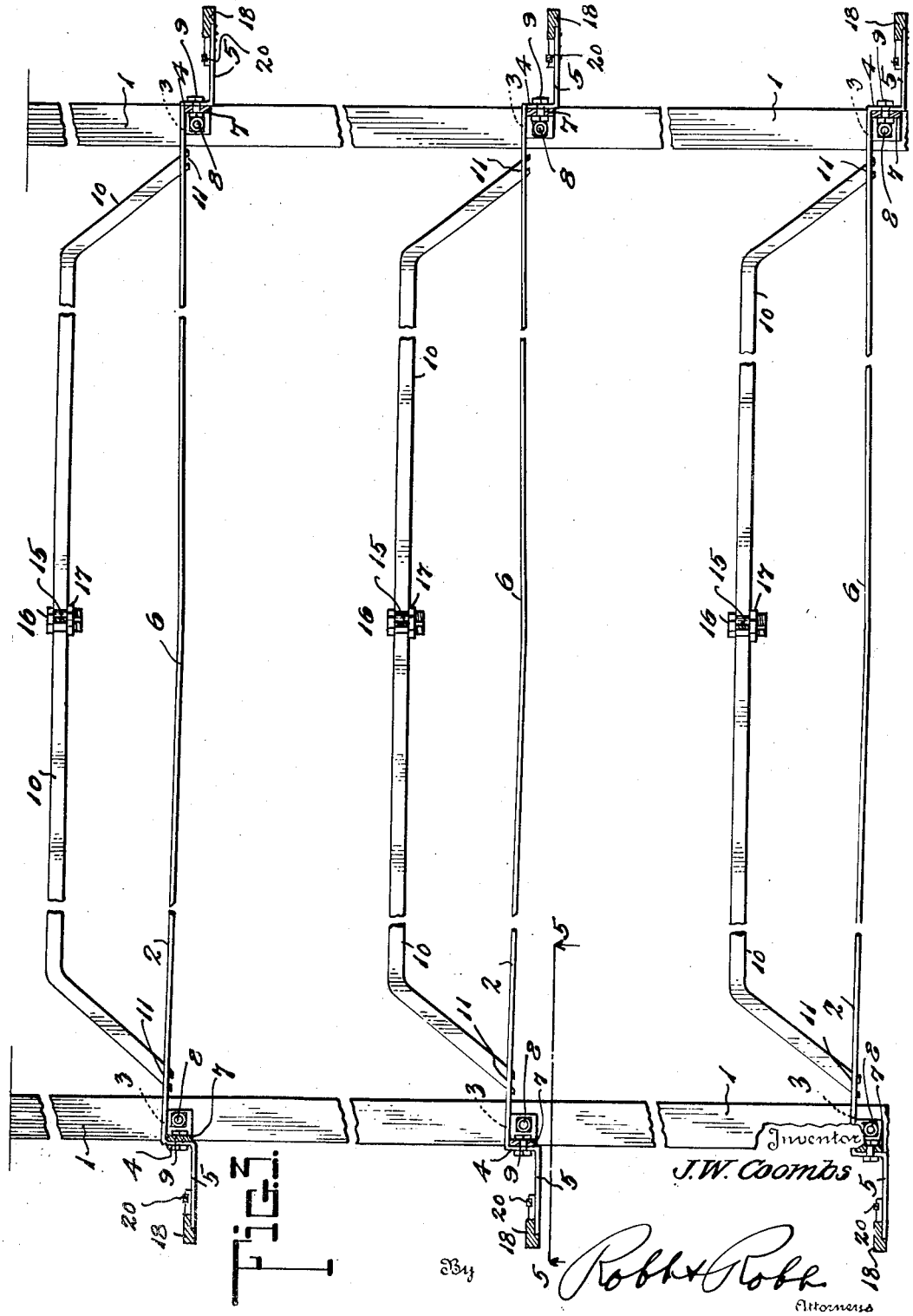

2,163,484

UNITED STATES PATENT OFFICE 2,163,484

FILE STORAGE STRUCTURE

James W. Coombs, Chicago, Ill.

Original application October 22, 1935, Serial No. 46,154. Divided and this application October 27, 1937, Serial No. 171,315

9 Claims. (Cl. 211—71)

The present invention relates to filing equipment for the storage and convenient handling of article containers, such as correspondence and data-containing file boxes, as shown and described in my Patent No. 2,102,995, dated December 21, 1937, of which this application is a division. In the above-identified patent, file storage compartments were provided, the structure of which forms the basis of this application.

These compartments are of skeleton, fabricated type having rail supports for guiding the wheeled carrier or conveyor to the respective compartments, the rail supports also constituting supporting means for the "third" rails which supply the electrical energy to the vehicle.

These rail supports constitute a vital structural bracing element of the skeleton framework and also provide the supporting rails for the file boxes as they are shifted into position in the compartments.

It is an object of the present invention to provide a file storage compartment structure of rack or skeleton formation which is extremely light, compact, and easily assembled with a minimum amount of labor and tools wherein the supporting framework and bracing structure occupy a minimum amount of space, thus permitting the utilization of a maximum amount of space for the storage of the file boxes within the compartments.

Another object is the provision and utilization of flat sheet or bar material in the fabrication of the framework with a minimum amount of machining, drilling or bending, and in which a minimum number of bolts or other securing means for fastening the framework together is utilized.

A still further object is the provision of a skeleton framework open at its opposite sides together with bracing means extending from one side to the other and constituting supporting flanges for the file boxes, these supporting flanges being inclined toward the central portion thereof to obtain the boxes within the framework and urge the boxes toward each other when inserted in the compartments from the opposite sides of the framework.

Another object is the provision of stop rails intermediate the ends of the supporting flanges for limiting the inward travel of the file boxes and constituting bracing means for the framework structure.

Other and further objects and advantages of the invention will be hereinafter set forth and the novel features thereof defined by the appended claims.

In the drawings:

Figure 1 is a fragmentary, perspective view of a portion of my improved skeleton framework for the reception of storage file boxes or suitable article containers.

Figure 2 is a fragmentary, front elevation showing one of the file box receiving openings and adjacent structure.

Figure 3 is a vertical sectional view taken substantially on the plane indicated by line 3—3 of Figure 2.

Figure 4 is an enlarged, detail view of the interlocking connection between the file box spacing guide means and the file box rear stop rail, the securing means for holding these two rails together being shown in detached position.

Figure 5 is a horizontal, sectional view taken approximately on the plane indicated by line 5—5 of Figure 3 and looking upwardly.

Figure 6 is a vertical, sectional view taken approximately on the plane indicated by line 6—6 of Figure 5.

Like reference characters designate corresponding parts in the several figures of the drawings.

In the drawings, 1 indicates vertical standards preferably of flat bar-like form and extending from the floor to the ceiling of the room or other space in which the filing compartments are to be located. These vertical standards are spaced apart slightly greater than the width of the file boxes to be stored, and are also spaced apart, as seen in Figure 1, at right angles to the aforementioned spacing a distance slightly in excess of twice the length of one of the file boxes, and have positioned thereon a plurality of vertically spaced and horizontally disposed file box carrier rails or article supporting rails 2. These rails are constructed of comparatively thin flat material and perforated at 3 to receive the vertical standards 1. The ends of the rails projecting beyond the standards 1 are bent downwardly, as indicated at 4, and then rebent at right angles to provide horizontally disposed track-supporting extensions 5. The carrier rails 2 are disposed intermediate each pair of compartments so that one portion of the track extends laterally into each compartment. The intermediate portion of this rail between the supporting standards inclines downwardly toward the center, as indicated at 6, so that upon the insertion of the file box the inclined supporting rails therefor tend to cause the box to move or gravitate toward the rear of the compartment.

Horizontal brace means or supporting rails 7 are provided at each end of the carrier rails 2 adjacent the downwardly bent portion 4. These rails 7 are secured to the vertical standards 1 by bolts or other securing means 8, clearly disclosed in Figure 5 of the drawings. The rails 7 are also secured to the carrier rails 2 by bolts 9.

Disposed above the file box carrier rails 2 in the plane of the standards 1 are a plurality of horizontal guide rails or bars 10. These bars are bent downwardly at their ends and provided with bifurcated extremities 11, as shown in Figures 5 and 6, which are inserted into apertures 12 formed in the central plane of each of the carrier rails 2 adjacent the vertical standards 1. These horizontal guide rails 10 comprise the guiding means for the file boxes to prevent lateral shifting thereof as they are inserted into the several compartments, and are of somewhat truss formation having a central notched portion 13 for receiving a correspondingly notched portion 14 formed in the intermediate stop rails 15 extending longitudinally through the skeleton framework at the central portion thereof.

The stop rails 15 and guide rails 10 are maintained in their interlocked relation, as seen in Figure 4, by a bolt member 16 having a hexagonal head portion 16a and a threaded shank portion 16b provided with a pair of intersecting slots 16c adapted to receive the intersecting guide and stop rails 10 and 15. The bolt member 16 is secured in position on the just referred to rails by a nut member 17, thus positively securing the rails in their interlocked relation.

The track-supporting extension 5 of the carrier rail 2, as seen more clearly in Figures 1 and 6, has secured at its extremity the carrier track 18, this track extending in the same horizontal plane past a plurality of the compartments, and is notched at 19 in front of each compartment for receiving the carrier stop means, not shown and forming no part of this application.

The conductor or third rails 20 are disposed between the track rails and the compartments in insulated relation to the carrier rail extensions 5, as clearly seen in the drawings.

These skeleton compartments are placed in adjacent rows so that the track in front of the compartments at one side of each row faces the track in front of the compartments at the other side of the adjacent row, thus providing a pair of tracks on which the carrier vehicle travels in front of each pair of compartments.

In assembling my improved skeleton structure, the apertured carrier rails 2 are first disposed on the vertical standards 1, after which the standards are properly secured in position in the space provided for the file compartment. The rails 2 are then elevated to their desired planes, and the horizontal brace or supporting rails 7 are secured to the standards 1 at the desired elevation, thus supporting the carrier rails in their proper position. The carrier rails are then secured to the brace rails 7 by the bolt members 9, preventing any relative movement of the rails 2. The bifurcated extremities 11 of the horizontal guide or spacing rails 10 are inserted in the apertures 12 in the carrier rails 2, and the bifurcated ends 11 may be bent laterally, if desired, to retain the guide rails in interlocking relation with the carrier rails. The horizontal stop rails 15 are preferably of a length corresponding to the complete length of the cabinet structure, although shorter lengths may be used if desired. These stop rails are placed over the central portion of the guide rails 10, and their notched portions 14 are disposed to receive the notched portions 13 in the guide rails. The fastening means 16 is then secured in place by the nut 17, thus preventing any lateral movement of the guide rails. The carrier tracks and conductor rails are secured to the horizontal extensions 5 by rivets or other suitable fastenings, thus completing the skeleton framework. From the above it will be observed that this structure is made of commercial flat sheet material with comparatively little machining or bending, and secured together with a minimum number of bolts and other securing means, thus providing a very inexpensive but quickly assembled structure of the class described for storage purposes.

Having thus described my invention, what I claim as new and desire to secure by Letters Patent is:

1. In filing equipment of the class described, a skeleton framework for storing a plurality of file containers comprising spaced standards between which file containers are adapted to be disposed, carrier rails for the containers interlocking with said standards, and truss means connected to said carrier rails at spaced points located adjacent said standards constituting guide and stop means for the containers.

2. In an article filing structure of the class described, a skeleton framework for storing a plurality of file containers, said framework comprising a plurality of spaced vertical standards, carrier rails interlocked with said standards and forming runways for the file containers, guide rails extending upwardly from and along said carrier rails, stop bars arranged transversely of the guide rails in interlocking relation therewith for holding said guide rails in spaced relation, and means for interlocking the rails and bars together.

3. In an article filing structure of the class described, a plurality of horizontally disposed flat carrier rails apertured intermediate their edges adjacent each end thereof, vertically disposed supporting standards for the carrier rails passing through the apertures in the carrier rails, horizontal supporting brace means for supporting the rails in vertically spaced relation to each other on the standards, securing means for fastening the horizontal supporting brace means to the vertical standards, and separate securing means for fastening the carrier rails to the supporting brace means.

4. In an article filing structure of the class described, a plurality of horizontally disposed flat carrier rails apertured intermediate their edges adjacent each end thereof, and having a portion intermediate the apertures and the ends bent downwardly, vertically disposed supporting standards for the carrier rails passing through the apertures in the carrier rails, and horizontal supporting brace means for securing the carrier rails in vertically spaced relation on the standards, said carrier rail supporting means comprising horizontally disposed bracing bar members secured to the downwardly bent portions of the carrier rails below the apertured ends thereof and to the supporting standards.

5. In an article filing structure of the class described, a plurality of horizontally disposed flat carrier rails apertured intermediate their edges adjacent each end thereof and having each end portion bent downwardly to provide a vertical securing face and stop shoulder, and then bent horizontally to form a track supporting extension, vertically disposed supporting standards for the carrier rails passing through the apertures in the carrier rails, means for supporting the rails in vertically spaced relation on the standards, said carrier rail supporting means comprising horizontally disposed rectangular bracing bar members disposed below the apertured ends of the carrier rails in supporting relation and engaging the stop shoulder and downwardly bent portion of the carrier rails and secured to the supporting standards, and separate means for securing the downwardly bent portions of the carrier rails to said bracing bar members.

6. In an article filing structure of the class described, supporting standards, a plurality of flat thin carrier rails disposed thereon in rows in vertical and horizontal intersecting planes, said carrier rails being apertured adjacent their ends, carrier track members connecting the ends of the carrier rails in a plane offset from the horizontal plane of the major portions of the carrier rails, said supporting standards being vertically disposed in spaced relation to each other in each of the aforesaid vertical planes and passing through the apertures in the ends of the carrier rails, horizontal bracing bar members disposed below each of the carrier rails in supporting relation thereto, means for securing said bracing bar members to said standards, and means for securing said bracing bar members to said carrier rails.

7. In an article storage structure of the class described, a pair of article carrier tracks disposed in spaced parallel relation in a horizontal plane, a plurality of flat thin file box carrier rails connecting the two tracks together and horizontally disposed in parallel relation at right angles to said tracks, vertical carrier standards passing through said file box carrier rails adjacent their ends and intermediate their edges, said carrier rails inclining downwardly from each end toward their central portion, and horizontal bracing means disposed below said carrier rails in supporting relation thereto and in parallel relation to said article carrier tracks connecting the supporting standards together.

8. In an article storage structure of the class described, a plurality of pairs of article carrier tracks disposed in parallel relation in different horizontal planes, flat connecting file box carrier rails connecting the tracks in each horizontal plane together and disposed at right angles to said tracks, vertical supporting standards passing through said carrier rails adjacent their ends and intermediate their edges, said carrier rails inclining downward between said supporting standards toward their central portions, a guide rail disposed above each of said carrier rails intermediate its edges and secured at its extremities to said carrier rail, having a central notched portion, a stop rail having notched portions interlocking the aforementioned notched portions of both of said guide rails and disposed at right angles to said guide rails.

9. In an article storage structure of the class described, a plurality of pairs of article carrier tracks disposed in parallel relation in different horizontal planes, flat connecting carrier rails connecting the tracks in each horizontal plane together and disposed at right angles to said tracks, vertical supporting standards passing through said carrier rails adjacent their ends and intermediate their edges, said carrier rails being bent upwardly intermediate the track connection and the intersection with the supporting standards to a point above said tracks and inclining downward between said supporting standards toward their central portions, a guide rail disposed above each of said carrier rails intermediate its edges and secured at its extremities to said carrier rail, having a central notched portion, a stop rail having notched portions interlocking the aforementioned notched portions of both of said guide rails and disposed at right angles to said guide rails.

JAMES W. COOMBS.